TELEPHONE SIGNALING CONVERSION CIRCUIT FOR PULSES AND TONES

Filed Sept. 30, 1963

2 Sheets-Sheet 1

INVENTORS R. C. GEBHARDT
A. E. SPENCER, JR
T. A. TAEBEL
BY R. C. Winter
ATTORNEY April 18, 1967 R. C. GEBHARDT ETAL 3,315,039

TELEPHONE SIGNALING CONVERSION CIRCUIT FOR PULSES AND TONES

Filed Sept. 30, 1963

2 Sheets-Sheet 2

United States Patent Office 3,315,039

Patented Apr. 18, 1967

3,315,039

TELEPHONE SIGNALING CONVERSION CIRCUIT FOR PULSES AND TONES

Robert C. Gebhardt, Parsippany, Albert E. Spencer, Jr., Holmdel, and Terry A. Taebel, Red Bank, N.J., assignors to Bell Telephone Laboratories, Incorporated, New York, N.Y., a corporation of New York Filed Sept. 30, 1963, Ser. No. 312,463
17 Claims. (Cl. 179—18)

Figure 1:
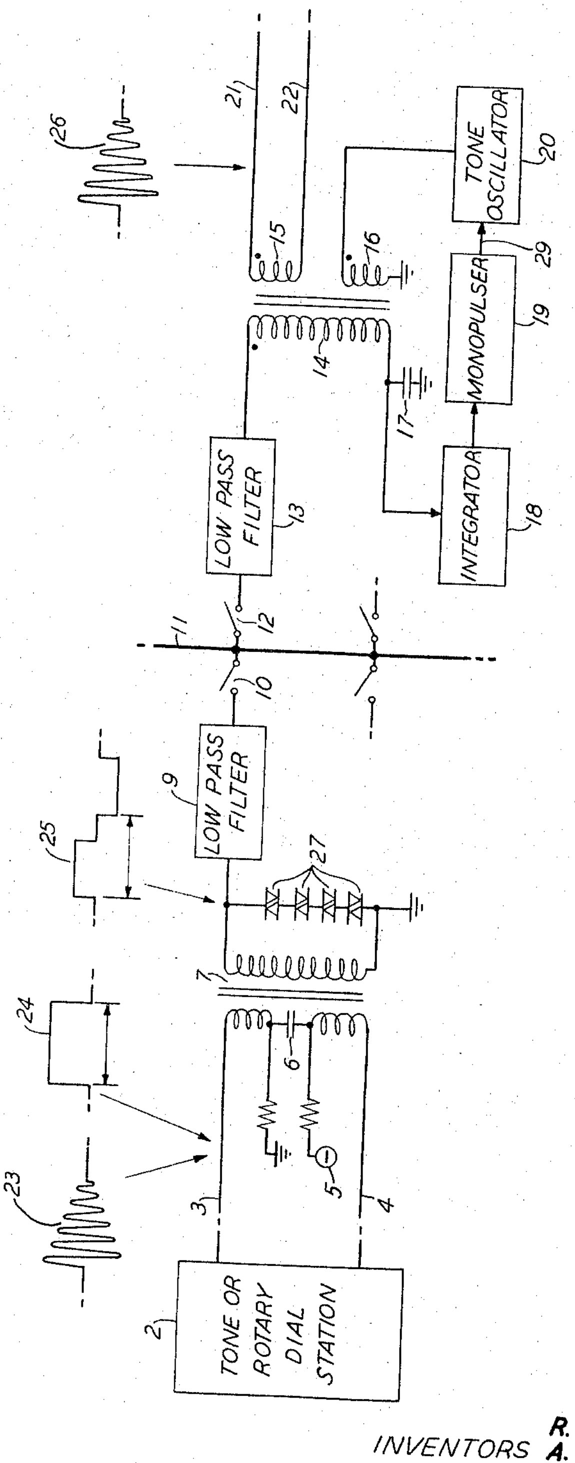

This invention relates to communications systems, and more particularly, to time division telephone signalling circuits that are compatible with both rotary dial and tone stations.

The conventional rotary dial is the most widely used circuit for originating digital information in present-day telephone systems. Each time the dial is turned and released, the loop circuit is opened a number of times equal to the value of the digit dialed. There are however other methods of transmitting equivalent digital information. One of these involves the transmission of a signal tone burst for each digit. In TOUCH-TONE dialing, for example, each tone burst comprises two distinct superimposed frequencies, each combination of two frequencies representing a different digit. Due to the fact that the various subscribers served by a single telephone system may be provided with either of the above-mentioned or similar dialing systems, it becomes necessary to make the telephone system compatible with both types of signals. That is, an originating register or equivalent mechanism must be capable of registering information originating with either type of dialing system.

In time division switching systems the problems presented by the compatibility requirement are more pronounced. A time division telephone system may have many lines, and a fewer number of trunks. If all dial pulses are to be converted to frequency combinations, the conversion equipment may be included in either the line circuits or the trunk circuits. As fewer trunks are employed than lines, it would seem advantageous to include the conversion circuitry in the trunk circuits rather than in the line circuits. However, the time division switching network must then be capable of passing dial pulses from the lines to the trunk circuits. The magnitudes of dial pulses and tone signals are not necessarily of the same order, and because of the nature of the switching network it is more difficult to achieve the required compatibility.

The present invention enables a time division switching system to be compatible with both dial and tone telephone stations, and although especially advantageous in the context of time division switching networks is nevertheless generally applicable to other types of communication systems.

It is a general object of this invention to provide a time division telephone signaling circuit for enabling a registering device to be compatible with both rotary dial and tone signals.

In one illustrative embodiment of the invention the subscriber line is connected through a transformer to a low pass filter, which in turn is connected through a switch to a talking bus. Each time the switch operates a sample of the line signal is delivered to the talking bus, and a sample from the talking bus is delivered to the line. The low pass filter smooths the samples in order that the subscriber be provided with a continuous signal.

The system also includes trunk circuits, each of which is connected through a low pass filter and switch to the talking bus. In the trunk circuit is included a transformer, the primary winding of which is connected to the low pass filter. The transformer secondary winding is connected to a signaling channel, e.g., a central office trunk.

If the subscriber is provided with a tone subset the tone bursts are transmitted directly through the transformer to the signaling channel. If, on the other hand, the subscriber is provided with a rotary dial, each dial pulse appearing across the transformer primary triggers a monostable multivibrator, which in turn controls the operation of a tone oscillator for a predetermined time interval. The tone oscillator is connected to another secondary winding of the transformer, and the tone burst from the oscillator is transmitted to the signaling channel. The tone oscillator injects a combination of two frequencies into the channel, this combination being different from any of the combinations originating in the tone subset. In this manner a receiver at the other end of the signaling channel can recognize this particular two-frequency tone burst as one for which each burst is to be counted (the total number of successive bursts comprising a digit), rather than simply interpreted as a digit. Circuitry is provided for preventing tones on the subscriber line, resulting from a tone subset operation, from triggering the monostable multivibrator. Only the rotary dial pulses trigger this multivibrator, and as a consequence only these pulses result in the application to the signaling channel of the special two-tone combination which represents a dial pulse rather than a digit.

It is a feature of this invention to provide transformer coupling to permit the direct transmission of tones from a subscriber line to a signaling channel.

It is another feature of this invention to provide means for detecting rotary dial pulses on the telephone line, and in response thereto for applying to the signaling channel a special two-frequency tone burst representing a single dial pulse.

It is another feature of this invention to provide means for preventing the erroneous operation of the detecting means by tones appearing on the subscriber line.

Figure 2:
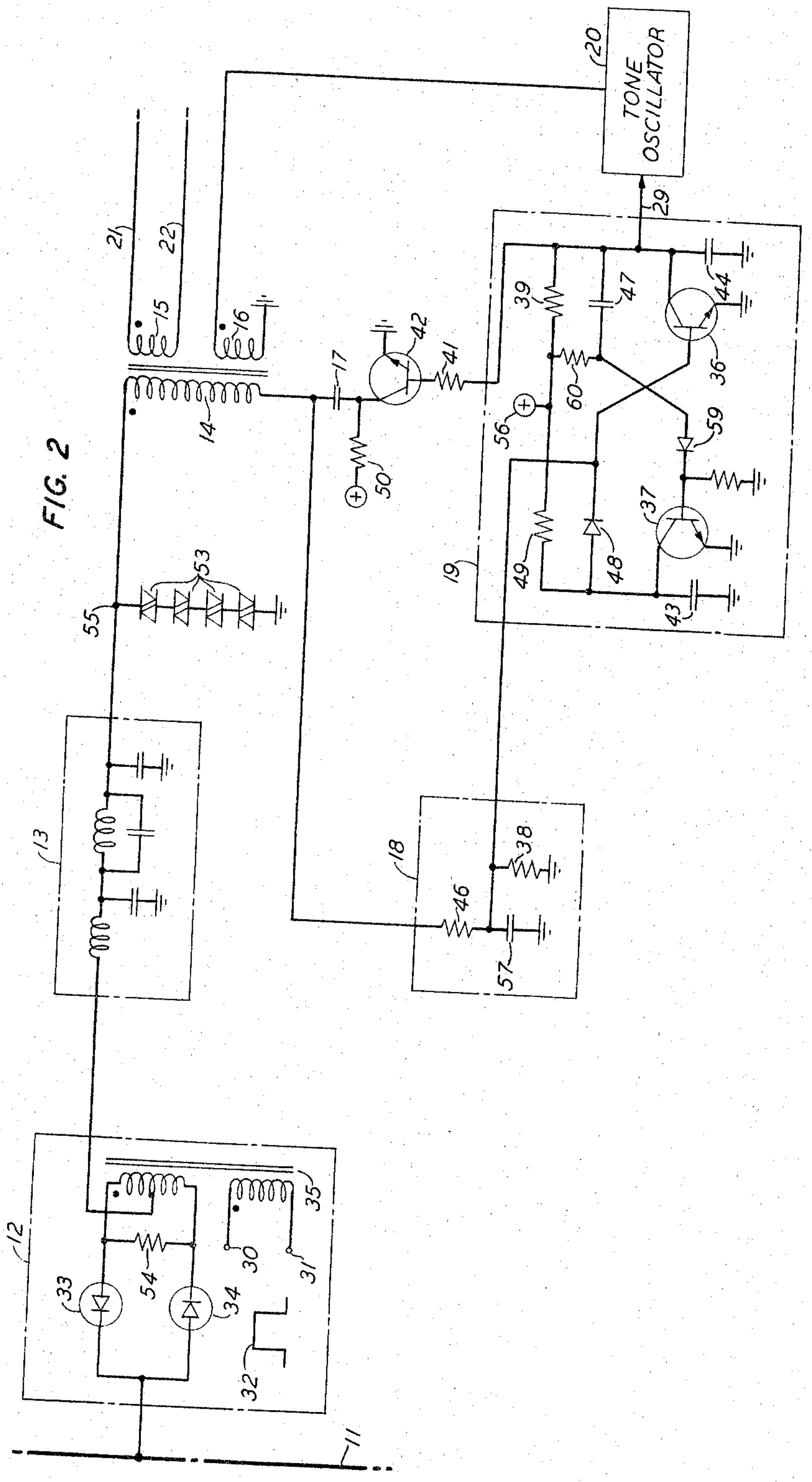

Further objects, features and advantages of the invention will become apparent upon consideration of the following detailed description in conjunction with the drawing in which:

FIG. 1 is a schematic representation of an illustrative embodiment of the invention, and FIG. 2 is a more detailed disclosure of part of an illustrative embodiment of the invention.

In FIG. 1 the tip and ring conductors 3 and 4 of the subscriber line are connected to line station 2. This station may be provided with either a tone subset or rotary dial, or even both bridged on the same line. Negative source 5 powers the telephone subset through a pair of resistors and the primary winding of transformer 7. Capacitor 6 is provided in order that the signals, both voice and dial, from the subset be shunted away from the resistors. Signals appearing on the line have the shape shown in waveform 23 if they arise from a tone station. Waveform 24 illustrates dial signals arising from a rotary dial station, with the higher potential representing the open loop line condition.

In a time division switching system many lines and many trunks are connected to the same common transmission bus 11. Each pair of lines, or line and trunk, is served in a different time slot. The essence of time division switching is that periodic samples of an information signal are sufficient to completely define the signal, and that these samples may be transmitted over a time shared common path. When sampling switches 10 and 12, shown only symbolically in the drawing, are momentarily closed, the line comprising conductors 3 and 4 is connected to the signaling channel comprising conductors 21 and 22 through the transformer coupling networks. Of all lines and trunks served by the time division switching network only these two are connected to the common bus in the time slot during which switches 10 and 12 are closed.

The simultaneous operations of these bilateral switches, although establishing a physical connection for only a small fraction of time in each cycle, in effect results in a continuous connection because of the smoothing action of low pass filters 9 and 13.

Diodes 27 limit the magnitude of signals across the secondary winding of transformer 7. Ordinarily, current steps in the primary windings would result in relatively large magnitude short duration differentiated pulses across the secondary winding. The diodes, in effect, serve as a low magnitude voltage supply. The induced secondary voltage is small in magnitude, but at the same time persists considerably longer than it would in the absence of the diodes. The voltage induced in the secondary winding by a dial pulse as thus shaped by the diodes 27 is shown in waveform 25. Because the rotary dial pulse waveform consists primarily of low frequency components, capacitor 17 does not short the signal to ground. Thus the signal arising from rotary dial pulse 24 has the shape shown in waveform 25 at the input of integrator 18.

Waveform 23, on the other hand, comprises a combination of relatively high frequencies. Capacitor 17 shorts the signal to ground, and thus no signal appears at the input of integrator 18. The tone signal appears across primary 14, is transmitted through the transformer directly to secondary winding 15, and through signaling channel conductors 21 and 22 to a receiver circuit. Waveform 26 thus has the same shape as waveform 23 when the original signal is a tone.

Waveform 25 is integrated by integrator 18. The response of an integrator to a pulse input builds up gradually rather than instantaneously. The integrator is provided to protect against noise. Noise signals, if they are present, will not be applied for a sufficient time duration for integrator 18 to allow a sufficient output pulse to develop which would trigger monopulser 19. As a result, only the rotary dial transients result in a sufficient integrator output to trigger the monopulser. Diodes 27 stretch the voltage induced in the secondary winding of transformer 7 by a dial pulse; integrator 18 can thus develop a sufficient output signal to trigger the monopulser.

In response to the positive output signal of integrator 18 monopulser 19 turns on tone oscillator 20. The oscillator is turned on only for the duration of the monopulser period. When the oscillator is on, a special two-frequency tone combination is applied to secondary winding 16. The signal is induced in secondary winding 15 and transmitted along signaling conductors 21 and 22 to the receiver circuit. Again, the resulting signal, waveform 26, is a tone signal. The receiver circuit recognizes this special two-frequency tone burst as representing a rotary dial pulse to be counted, rather than interpreted as a digit.

If it is desired to isolate the line circuit from oscillator 20 when the latter is turned on, a high impedance may be placed in series with winding 14. For example, the monopulser, in its unstable state, may control the insertion of a high resistance in series with winding 14. With this high impedance included in series with the primary winding 14 the oscillator feeds into an impedance essentially independent of the line circuit, and dependent only upon the impedance of the signaling channel comprising conductors 21 and 22.

A particular advantage of the illustrative embodiment of the invention is that the unbalanced time division communication path may be connected between a balanced line and a balanced signaling channel. The principles of the invention, however, are equally applicable to other situations, e.g., where the middle communication path is also balanced.

FIG. 2 depicts in more detail part of an illustrative embodiment of the invention. The trunk circuit is connected through low pass filter 13 and switch 12 to talking bus 11. The switch is enabled when a drive pulse 32 is applied between terminals 30 and 31 on the primary winding of transformer 35. The pulse induced in the secondary winding of the transformer causes PNPN diodes 33 and 34 to break down. A circulating drive current is maintained in the loop comprising these diodes and the secondary winding of transformer 35. When the drive pulse 32 terminates, the diodes return to the high impedance state, and the switch is opened. Resistor 54 is provided to damp the pulse transformer. During the drive pulse interval talking bus 11 is connected through switch 12 to filter 13. For a further description of this type of switch reference may be made to H. S. Feder Patent 3,086,083, Apr. 16, 1963.

The filter smooths the samples from talking bus 11 and provides a continuous signal at terminal 55. This signal is approximately the same as that originally appearing across diodes 27 in FIG. 1. Diodes 53 are provided in FIG. 2 merely to limit the peak voltage in the trunk circuit.

Before the subscriber dials, the trunk circuit is in its quiescent state. The base of transistor 36 is connected through resistor 38 to ground, and as the base-emitter junction of this transistor is not forward biased the transistor remains off. The collector of the transistor is thus not grounded through the transistor, and conductor 29 is connected through resistor 39 to source 56. The high voltage on conductor 29 holds tone oscillator 20 off.

The base of transistor 42 is connected through resistors 39 and 41 to source 56. As the junction of resistors 39 and 41 is positive in potential, transistor 42 conducts. Capacitor 17 is thus connected through the transistor to ground. As in FIG. 1, this capacitor shorts out tone signals to ground to prevent them from triggering monopulser 19.

In the quiescent state transistor 37 conducts. Source 56 is connected through resisotr 60 and diode 59 to the base of transistor 37. The transistor thus conducts and its collector is maintained at approximately ground potential. Diode 48 is reverse biased, and prevents current flow from source 56 through resistor 49 and the diode to the base of transistor 36. Capacitors 43 and 44 are provided merely to prevent false operation of the monopulser due to noise in the circuit.

Each dial pulse results in a positive voltage appearing at the junction of capacitor 17 and resistor 46. The magnitude and duration of this voltage is determined, as in FIG. 1, by diodes 27. The voltage signal is integrated by resistors 46 and 38, and capacitor 57. The resulting voltage at the junction of resistor 38 and capacitor 57 partially turns on transistor 36. Integrator 18 is provided to insure that the monopulser be triggered only by dial pulses. A sufficient signal for turning on transistor 36 is not developed at the junction of resistor 38 and capacitor 57 by noise signals in the circuit.

When transistor 36 turns on its collector voltage drops slightly in magnitude. This drop in potential is transmitted through capacitor 47 to reverse bias diode 59. Transistor 37 thus turns off. As the collector of transistor 37 is no longer connected through the transistor to ground, diode 48 becomes forward biased, and current flows from source 56 through resistor 49, diode 48, and the base-emitter junction of transistor 36. Transistor 36 thus conducts more heavily, further insuring that transistor 37 is held off.

With transistor 36 conducting, its collector is connected through the transistor to ground. Ground potential on conductor 29 turns on tone oscillator 20. The ground potential at the junction of resistors 39 and 41 also turns off transistor 42, the base-emitter junction no longer being forward biased. Capacitor 17 is no longer shorted through transistor 42 to ground. Instead, resistor 50 is inserted in series with capacitor 17 and the talking path. This resistor effectively isolates the line circuit connected to the talking bus from the trunk circuit to prevent interference with the tone burst.

When transistor 36 first turns on the junction of capacitor 47 and resistor 60 drops in potential to reverse bias diode 59 and transistor 37. During the unstable state of the monopulser, this junction increases in potential. Current flows from source 56 through resistor 60, capacitor 47, and transistor 36. When the junction of capacitor 47 and resistor 60 becomes positive, diode 59 and transistor 37 become forward biased. At this time, diode 48 becomes reverse biased and transistor 36 turns off. The monopulser is once again in its quiescent state. The next dial pulse again triggers the monopulser, and another tone burst is applied to winding 16 by oscillator 20.

In this manner the same line and signaling channel connection permits dialing from either tone or rotary dial telephone sets, or even both bridged on the same line. Both result in a tone burst on the channel, signals from the tone set being transmitted directly to the channel, and signals from the rotary dial set being converted to a tone burst. Only rotary dial pulse transients trigger the multivibrator, and erroneous operation of the tone oscillator by either tone signals or noise is precluded.

It is to be understood that the embodiment shown is merely exemplary, and that various modifications will be apparent to those skilled in the art without departing from the spirit and scope of the invention.

What is claimed is:

1. A transmission circuit comprising a transformer having three inductively coupled windings, a plurality of telephone lines connected through a time division switching network to a first one of said windings, a trunk connected to a second one of said windings, a tone oscillator connected to the third one of said windings, means connected to said first winding for turning on said tone oscillator for a predetermined time interval in response to receipt in said first winding of rotary dial pulses appearing on said line, and means for inhibiting the operation of said tone oscillator responsive to the receipt in said first winding of tone bursts appearing on said line.

2. A transmission circuit comprising transformer means interconnecting a telephone line and a signaling channel, means for applying rotary dial pulses and tone bursts appearing on said line to said transformer means, said tone bursts passing directly through said transformer to said channel, detecting means connected to said transformer, and means for applying a tone burst to said channel responsive to the detection of a rotary dial pulse by said detecting means.

3. A transmission circuit in accordance with claim 2 wherein the tone bursts appearing on said line comprise combinations of two frequencies selected from a plurality of frequencies, and wherein said means for applying a tone burst to said channel comprises means for applying a two-frequency tone combination different from the combinations of frequencies appearing on said line.

4. A transmission circuit in accordance with claim 2 further including means for preventing said detecting means from operating responsive to said tone bursts appearing in said line, and means for preventing said detecting means from operating responsive to noise signals appearing in said line.

5. A signaling circuit comprising a first channel and a second channel, transformer means including a first winding and a second winding for transmitting first signals having relatively high frequency components from said first channel to said second channel, means for connecting said first channel to said first winding, means for connecting said second channel to said second winding, means connected to said first winding for detecting second signals having relatively low frequency components on said first channel, and means connected between said transformer and said detecting means for applying to said second channel third signals having relatively high frequency components responsive to the detection of said second signals by said detecting means.

6. A signaling circuit in accordance with claim 5 wherein said means for connecting said first winding to said first channel further includes a time division switching network for transmitting both said first and second signals appearing on said first channel to said first winding with negligible distortion.

7. In a telephone system, a signaling circuit comprising a first channel and a second channel, means interconnecting said first and second channels for enabling first signals having frequency components within a first frequency spectrum appearing on said first channel to be transmitted directly to said second channel, means connected to said interconnecting means for detecting second signals having frequency components within a second frequency spectrum on said first channel, and means responsive to said detecting means for applying to said second channel third signals having frequency components distinct from the frequency components of said first and second signals.

8. A transmission circuit comprising a telephone line, a trunk, means inductively coupling said line to said trunk for transmitting tone signals from said line to said trunk, means for detecting dial pulses appearing in said line, and means responsive to said detecting means for applying tone signals to said trunk.

9. A transmission circuit in accordance with claim 8 wherein said tone signal applying means includes means for controlling the application of said tone signals to said trunk for a predetermined time interval responsive to each operation of said detecting means.

10. A transmission circuit comprising a transformer having first, second and third windings and means for transferring both rotary dial pulses and multifrequency tone bursts appearing on said first winding to said second winding solely in the tone burst form comprising integrating means connected to said first winding and responsive to receipt of a rotary dial pulse from said first winding for providing a distinct output signal, a tone oscillator connected to said third winding, timing means connected between said integrating means and said tone oscillator and responsive to said distinct output signal from said integrating means for turning on said tone oscillator for a predetermined time interval, and capacitor means connected to said first winding for preventing tone bursts on said first winding from being applied to said integrating means.

11. A transmission circuit in accordance with claim 10 further including switching means responsive to said timing means for inserting a high impedance in series with said capacitor means.

12. A transmission circuit comprising a plurality of telephone lines, a trunk, a plurality of first transformers having two inductively coupled windings, each of said telephone lines being connected to a first one of said windings of each of said first transformers, a second transformer having three inductively coupled windings, a first one of said second transformer windings being connected to said trunk, a tone oscillator connected to a second one of said second transformer windings, a time division switching network connected between the second winding of each of said first transformers and the third winding of said second transformer, means connected to said third winding of said second transformer for turning on said tone oscillator for a predetermined time interval responsive to the receipt of rotary dial pulses being transmitted from one of said lines, and means connected to said third winding for inhibiting the operation of said tone oscillator responsive to the transmission of tone bursts from one of said lines.

13. A transmission circuit in accordance with claim 12 further including diode means connected across said second winding of said first transformer for limiting in magnitude and stretching in duration pulses induced in said second winding of said first transformer by rotary dial pulses appearing across said first winding of said first transformer.

14. A transmission circuit in accordance with claim 12 further including pulse shaping means connected across said second winding of said first transformer for controlling the shape of pulses induced in said second winding of said first transformer by rotary dial pulses appearing across said first winding of said first transformer.

15. A transmission circuit comprising a balanced line, a balanced signaling channel, an unbalanced communication path interconnecting said balanced line and said balanced channel, means for applying to said balanced line rotary dial pulses and tone bursts, said tone bursts passing directly through said unbalanced communication path to said balanced channel, means connected to said unbalanced communication path for detecting a rotary dial pulse transmitted from said balanced line to said unbalanced communication path, and means responsive to said detecting means for applying a tone burst to said balanced channel.

16. A transmission circuit in accordance with claim 15 further including pulse shaping means connected to said unbalanced communication path for controlling the rotary dial pulses in said unbalanced communication path to have a wave shape different from the wave shape of the rotary dial pulses in said balanced line.

17. A transmission circuit in accordance with claim 15 further including means responsive to said detecting means for inserting a high impedance in series with said unbalanced communication path.

References Cited by the Examiner

UNITED STATES PATENTS

| | | | |
|---|---|---|---|
| 2,626,996 | 1/1953 | Brown | 179—16 |
| 3,133,155 | 5/1964 | Kuchas | 179—18 |
| 3,146,314 | 8/1964 | Boehly et al. | 179—18 X |
| 3,205,312 | 9/1965 | Brightman et al. | 179—15 X |
| 3,221,108 | 11/1965 | Seeman et al. | 179—16 X |

FOREIGN PATENTS

| | | |
|---|---|---|
| 1,020,404 | 2/1966 | Great Britain. |

KATHLEEN H. CLAFFY, *Primary Examiner.*

L. A. WRIGHT, *Assistant Examiner.*